United States Patent
Tanabe et al.

(10) Patent No.: US 10,719,949 B2
(45) Date of Patent: Jul. 21, 2020

(54) METHOD AND APPARATUS FOR MONITORING REGION AROUND VEHICLE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Ken Tanabe, Kariya (JP); Hiroaki Ito, Toyota (JP); Naohide Uchida, Numazu (JP)

(73) Assignees: DENSO CORPORATION, Kariya, Aichi-Pref. (JP); TOYOTA JIDOSHA KABUSHIKI KAISHA, Toyota-Shi, Aichi-Ken (JP)

(*) Notice: Subject to any disclaimer, the term of this patent is extended or adjusted under 35 U.S.C. 154(b) by 112 days.

(21) Appl. No.: 16/142,499

(22) Filed: Sep. 26, 2018

(65) Prior Publication Data
US 2019/0102898 A1    Apr. 4, 2019

(30) Foreign Application Priority Data
Sep. 29, 2017 (JP) ................... 2017-192069

(51) Int. Cl.
G06K 9/00    (2006.01)
G06T 7/593   (2017.01)
(Continued)

(52) U.S. Cl.
CPC .......... G06T 7/593 (2017.01); G06K 9/00805 (2013.01); G06K 9/6202 (2013.01);
(Continued)

(58) Field of Classification Search
CPC .......... G06T 7/593; G06T 2207/30261; G06T 2207/10028; G08G 1/167; G06K 9/6202;
(Continued)

(56) References Cited

U.S. PATENT DOCUMENTS 5,410,346 A    4/1995  Saneyoshi et al.
6,956,469 B2 * 10/2005  Hirvonen ........... G06K 9/00201
                                                    340/425.5
(Continued)

FOREIGN PATENT DOCUMENTS

JP    H05-265547 A    10/1993

*Primary Examiner* — Amir Alavi
(74) *Attorney, Agent, or Firm* — Maschoff Brennan (57) ABSTRACT

In a monitoring apparatus, a disparity calculator obtains, for each point of a target object, a pair of matched pixel regions in respective base image and reference image corresponding to the point of the target object. The disparity calculator calculates a disparity of each of the matched pixel regions of the base image relative to the corresponding matched pixel region of the reference image. A distance calculator corrects the calculated disparity of each of the matched pixel regions of the base image in accordance with a tolerable disparity range for the disparity to thereby increase the calculated disparity of the corresponding one of the matched pixel regions of the base image. The distance calculator calculates the depth distance of each point of the target object relative to the vehicle as a function of the corrected disparity of the corresponding one of the matched pixel regions.

7 Claims, 3 Drawing Sheets

(51) Int. Cl.
*G08G 1/16* (2006.01)
*G06K 9/62* (2006.01)
*H04N 13/128* (2018.01)
*B60Q 9/00* (2006.01)
*H04N 13/239* (2018.01)
*B60K 31/00* (2006.01)
*H04N 13/00* (2018.01)

(52) U.S. Cl.
CPC ........... *G08G 1/167* (2013.01); *H04N 13/128* (2018.05); *B60K 31/0008* (2013.01); *B60Q 9/00* (2013.01); *G06K 2009/6213* (2013.01); *G06T 2207/10012* (2013.01); *G06T 2207/10028* (2013.01); *G06T 2207/30261* (2013.01); *H04N 13/239* (2018.05); *H04N 2013/0081* (2013.01)

(58) Field of Classification Search
CPC ......... G06K 2009/6213; H04N 13/239; H04N 13/128
See application file for complete search history.

(56) References Cited

U.S. PATENT DOCUMENTS

| | | | |
|---|---|---|---|
| 7,486,803 B2 * | 2/2009 | Camus | B60R 21/013 382/104 |
| 8,194,998 B2 * | 6/2012 | Saito | G06K 9/00825 382/274 |
| 8,548,229 B2 * | 10/2013 | Badino | G06K 9/00805 382/106 |
| 8,582,818 B2 * | 11/2013 | Hammarstrom | G06K 9/00208 382/104 |
| 9,113,142 B2 * | 8/2015 | Boisson | H04N 13/122 |
| 9,679,205 B2 * | 6/2017 | Chen | G06K 9/00805 |
| 9,832,455 B2 * | 11/2017 | Liu | H04N 13/239 |
| 10,178,373 B2 * | 1/2019 | Ramachandra | G06T 7/85 |
| 10,354,151 B2 * | 7/2019 | Yoon | G06T 7/174 |
| 2019/0102642 A1 * | 4/2019 | Tanabe | G06K 9/3233 |
| 2019/0102898 A1 * | 4/2019 | Tanabe | H04N 13/128 |

\* cited by examiner

METHOD AND APPARATUS FOR MONITORING REGION AROUND VEHICLE

CROSS REFERENCE TO RELATED APPLICATION

This application is based on and claims the benefit of priority from Japanese Patent Application No. 2017-192069 filed on Sep. 29, 2017, the disclosure of which is incorporated in its entirety herein by reference.

TECHNICAL FIELD

The present disclosure relates to surround view monitoring methods and apparatuses for monitoring a region around a vehicle based on images captured around a vehicle from respective different positions of the vehicle.

BACKGROUND

There is known a technology that calculates a disparity data item of each point of a target object based on at least a pair of images of the target object captured around a vehicle using triangulation theory, and calculates, based on the disparity data items, distance information about the target object; the distance information includes a distance of each point of the target object relative to the vehicle. Then, the technology monitors the target object based on the distance information about the target object.

For example, Japanese Patent Application Publication No. H05-265547, which will be referred to as a published patent document, discloses a surround view monitoring apparatus based on the above technology. Specifically, the surround view monitoring apparatus obtains, based on a pair of images of a target object captured by a stereo camera installed in a vehicle, a distance distribution comprised of a distance of each point of the target object. Then, the surround view monitoring apparatus obtains three-dimensional distance information about the target object based on the distance distribution to thereby measure the shape and/or positional relationship between the target object and the vehicle.

SUMMARY

A collision avoidance system using such a conventional surround view monitoring apparatus disclosed in the published patent document is configured to instruct at least one collision-avoidance unit to perform a task of avoiding a collision between an own vehicle and a target object when determining that an actual distance between the own vehicle and the target object is smaller than a predetermined threshold distance.

In consideration of calculation errors resulting from the calculation of an actual distance between the target object and the own vehicle based on the conventional technology, the collision avoidance system is configured to establish far-side and near-side tolerances for distance of the target object relative to the own vehicle.

The far-side and near-side tolerances for distance of the target object relative to the own vehicle can be converted into first and second tolerances for a disparity data item of each point of the target object. That is, a disparity data item of each point of a target object used by the conventional surround view monitoring system has the first and second tolerances therefor.

The first tolerance for the disparity data item of each point of the target object represents a near side tolerance for the disparity data item, and the second tolerance for the disparity data item of each point of the target object represents a far side tolerance for the disparity data item.

Let us assume that (1) There is a first case where a calculated value for the disparity data item of each point of the target object has a positive deviation from a true value (2) There is a second case where a calculated value for the disparity data item of each point of the target object has a negative deviation from a true value (3) The absolute amounts of the respective positive and negative deviations are equal to each other.

In this assumption, because of the triangulation theory, a far-side deviation of distance of the target object based on the negatively deviated calculated value for the disparity data item of each point of the target object in the first case is larger than a near-side deviation of distance of the target object based on the positively deviated calculated value for the disparity data item of the corresponding point of the target object in the second case.

That is, if the absolute length of the far-side tolerance for distance of the target object and the absolute length of the near-side tolerance therefor are set to be identical to each other, the absolute length of the first tolerance for the disparity data item of each point of the target object is smaller than the absolute length of the second tolerance for the disparity data item of the corresponding point of the target object.

This may result in, even if the total range of the first and second tolerances for the disparity data item is within the disparity tolerance range calculated based on the respective far-side and near-side tolerances for distance of the target object relative to the own vehicle, a far-side deviation of distance of the target object may cause an actual distance between the own vehicle and the target object to exceed the far-side tolerance for distance of the target object relative to the own vehicle. This may cause a loss of ability to perform the task of avoiding a collision between the own vehicle and the target object.

From this viewpoint, the present disclosure seeks to provide methods and apparatuses for monitoring a region around a vehicle, each of which is capable of addressing the issue set forth above. Specifically, the present disclosure seeks to provide such methods and apparatuses, each of which is capable of properly monitoring a target object around a vehicle independently of the direction of a deviation of a disparity data item from a true value.

According to a first exemplary aspect of the present disclosure, there is provided an apparatus for monitoring a target object around a vehicle based on at least a pair of a base image and a reference image synchronously captured at respective different positions of the vehicle. Each of the base and reference images is comprised of a plurality of pixel regions. The apparatus includes a disparity calculator configured to obtain, for each point of the target object, a pair of matched pixel regions in the respective base image and reference image corresponding to the point of the target object. The disparity calculator is configured to calculate a disparity of each of the matched pixel regions of the base image relative to the corresponding matched pixel region of the reference image. The apparatus includes a distance calculator configured to correct the calculated disparity of each of the matched pixel regions of the base image in accordance with a predetermined tolerable disparity range for the disparity to thereby increase the calculated disparity of the corresponding one of the matched pixel regions of the base image. The predetermined tolerable disparity range corresponding to a predetermined tolerable distance range for a depth distance of the target object relative to the vehicle. The distance calculator is configured to calculate the depth distance of each point of the target object relative to the vehicle as a function of the corrected disparity of the corresponding one of the matched pixel regions.

According to a second exemplary aspect of the present disclosure, there is provided a method of monitoring a target object around a vehicle based on at least a pair of a base image and a reference image synchronously captured at respective different positions of the vehicle. Each of the base and reference images is comprised of a plurality of pixel regions. The method includes (1) Obtaining, for each point of the target object, a pair of matched pixel regions in the respective base image and reference image corresponding to the point of the target object (2) Calculating a disparity of each of the matched pixel regions of the base image relative to the corresponding matched pixel region of the reference image (3) Correcting the calculated disparity of each of the matched pixel regions of the base image in accordance with a predetermined tolerable disparity range for the disparity to thereby increase the calculated disparity of the corresponding one of the matched pixel regions of the base image, the predetermined tolerable disparity range corresponding to a predetermined distance tolerable range for a depth distance of the target object relative to the vehicle (4) Calculating the depth distance of each point of the target object relative to the vehicle as a function of the corrected disparity of the corresponding one of the matched pixel regions According to a third exemplary aspect of the present disclosure, there is provided an apparatus for monitoring a target object around a vehicle based on at least a pair of a base image and a reference image synchronously captured at respective different positions of the vehicle. Each of the base and reference images is comprised of a plurality of pixel regions. The apparatus includes a processor, a non-transitory computer readable storage medium, and a set of computer-executable instructions stored on the computer-readable storage medium that cause the processor to implement (1) Obtaining, for each point of the target object, a pair of matched pixel regions in the respective base image and reference image corresponding to the point of the target object (2) Calculating a disparity of each of the matched pixel regions of the base image relative to the corresponding matched pixel region of the reference image (3) Correcting the calculated disparity of each of the matched pixel regions of the base image in accordance with a predetermined tolerable disparity range for the disparity to thereby increase the calculated disparity of the corresponding one of the matched pixel regions of the base image, the predetermined tolerable disparity range corresponding to a predetermined distance tolerable range for a depth distance of the target object relative to the vehicle (4) Calculating the depth distance of each point of the target object relative to the vehicle as a function of the corrected disparity of the corresponding one of the matched pixel regions Each of the first to third exemplary aspects of the present disclosure corrects the calculated disparity of each of the matched pixel regions of the base image to thereby increase the calculated disparity of the corresponding one of the matched pixel regions of the base image. This enables the difference between a far-side deviation of the depth distance due to a negative-side deviation of the disparity and a near-side deviation of the depth distance due to a positive-side deviation of the disparity to be reduced. This therefore enables at least the negative deviation range of the disparity to have a margin, making it possible to more accurately monitor the target object around the vehicle based on the depth distance of each point of the target object.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

The following describes a present embodiment of the present disclosure with reference to the accompanying drawings. The present disclosure is not limited to the following present embodiment, and can be modified.

The following describes an example of the structure of a surround view monitoring apparatus 10 according to the present embodiment of the present disclosure with reference to FIGS. 1 to 4.

Figure 1:
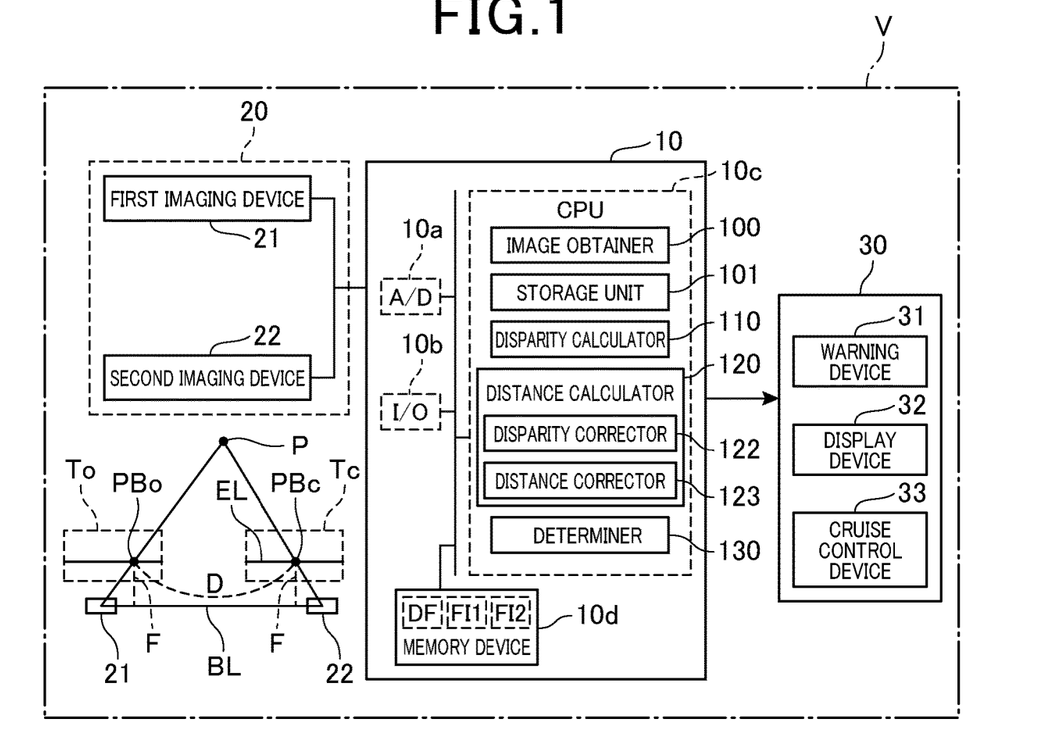
FIG. 1 is a block diagram schematically illustrating an example of the overall structure of a surround view monitoring apparatus according to a present embodiment of the present disclosure.

Referring to FIG. 1, the surround view monitoring apparatus 10 functionally includes an image obtainer 100, a storage unit 101, a disparity calculator 110, a distance calculator 120, and a determiner 130. For example, the surround view monitoring apparatus 10 is comprised of, for example, an electronic control unit (ECU) including, for example, an A/D converter 10a, an input/output (I/O) interface 10b, a CPU 10c, and a memory device 10d including, for example, at least one of semiconductor memories, such as a RAM and a ROM, and an image memory; these components 10a to 10d are communicably connected to each other. Each of the semiconductor memories is an example of a non-transitory computer-readable storage medium.

For example, a microcontroller or a microcomputer in which functions of a computer system have been collectively installed embodies the surround view monitoring apparatus 10. For example, the CPU 10c of the surround view monitoring apparatus 10 executes the set of computer-executable instructions of at least one program the set of computer-executable instructions of at least one program stored in the memory device 10d, thus implementing the functional modules 100, 101, 110, 120, and 130. Similarly, the functional modules 100, 101, 110, 120, and 130 can be implemented by at least one hardware unit and/or at least one software and hardware hybrid circuit. A plurality of microcontrollers or microcomputers can embody the surround view monitoring apparatus 10. The surround view monitoring apparatus 10 can include a field-programmable gate array (FPGA) in addition to or in place of the CPU 10c. The FPGA or the combination of the FPGA and the CPU 10c can s implement the functional modules 100, 101, 110, 120, and 130. The memory device 10d serves as a storage in which the at least one program is stored, and also serves as a working memory in which the CPU 10c performs various tasks.

The surround view monitoring apparatus 10 is communicably connected to a distance image sensor apparatus 20 and cruise assist devices 30 installed in a vehicle V.

For example, the surround view monitoring apparatus 10 can also be installed in the vehicle V, or can be arranged separately from the vehicle V.

The distance image sensor apparatus 20 is configured to capture an image, i.e. a surround-view image, around the vehicle V, and the surround view monitoring apparatus 10 is configured to detect, based on the image captured by the distance image sensor apparatus 20, at least one target object around the vehicle V.

The distance image sensor apparatus 20 includes a stereo camera comprised of first and second imaging devices 21 and 22. The first and second imaging devices 21 and 22 are aligned such that the alignment direction of the first and second imaging devices 21 and 22 crosses an optical axis of each of the first and second imaging devices 21 and 22. This arrangement of the first and second imaging devices 21 and 22 enables the first and second imaging devices 21 and 22 to capture different surround-view images of at least one common target object around the vehicle from the respective different positions in the vehicle V.

For example, the first and second imaging devices 21 and 22 are located close to the rearview mirror of the vehicle V while maintaining (1) The optical axis of the first imaging device 21 and the optical axis of the second imaging device 22 have the same height and are perpendicular to the width direction of the vehicle V (2) The minimum distance, i.e. interval, between the optical axis of the first imaging device 21 and the optical axis of the second imaging device 22 along the width direction of the vehicle is set to a predetermined length This arrangement of the first and second imaging devices 21 and 22 enables the first and second imaging devices 21 and 22 to capture front-view images of at least one common target object in front of the vehicle V from the respective different positions in the vehicle V.

The length of the minimum distance between the optical axis of the first imaging device 21 and the optical axis of the second imaging device 22 is identical to a predetermined length of a baseline (see BL in FIG. 1) between the center of the optical lens of the first imaging device 21 and the center of the optical lens of the second imaging device 22.

Each of the first and second imaging devices 21 and 22 includes an optical lens with a predetermined focal length F (see FIG. 1), and an image sensor, such as a charge-coupled device (CCD) image sensor, a complementary metal oxide semiconductor (CMOS) image sensor, or an infrared camera. The image sensor is comprised of light-sensitive elements; the light-sensitive elements serve as pixels and are arranged in a two-dimensional array. That is, the array of the pixels is configured as a predetermined number of vertical columns by a predetermined number of horizontal rows. The two-dimensionally arranged pixels constitute an imaging area, i.e. a light receiving area.

Each of the first and second imaging devices 21 and 22 is configured to periodically perform a capturing task that causes the two-dimensionally arranged light sensitive elements to be exposed to light incident to the imaging area from a common at least one target object via the optical lens during a shutter time, i.e. an exposure time or at a shutter speed, so that each of the two-dimensionally arranged light-sensitive elements (pixels) receives a corresponding component of the incident light.

The two-dimensionally arranged light-sensitive elements of each of the first and second imaging devices 21 and 22 according to the present embodiment are comprised of plural pixel regions constitute a frame image captured by the corresponding one of the first and second imaging devices 21 and 22.

The shutter time of the first imaging device 21 is synchronized with the shutter time of the second imaging device 22, so that the frame image captured by the first imaging device 21 is synchronized with the frame image captured by the second imaging device 22.

Each of the pixel regions for each of the first and second imaging devices 21 and 22, which constitute a corresponding one of the frame images, can consist of a single pixel or plural pixels. Each of the pixel regions for the first and second imaging devices 21 and 22, which constitute a corresponding one of the frame images, can consist of at least the array of at least two pixels in the vertical column direction of the imaging area and at least two pixels in the horizontal row of the direction of the imaging area, which can be represented as (2×2). In other words, each of the pixel regions has the matrix size of equal to or larger than the matrix size (2×2).

Each of the pixel regions for each of the first and second imaging devices 21 and 22 converts the intensity or luminance level of the light component received on the corresponding pixel region into luminance information item indicative of an analog pixel value or an analog pixel signal, that is associated with the luminance level of the received light component. That is, the luminance information items about all the pixel regions constitute a corresponding frame image.

For example, if each of the pixel regions consists of a single pixel, the luminance level of the pixel represents the luminance information item about the corresponding pixel region. If each of the pixel regions consists of plural pixels, the average value, the maximum value, the minimum value, or a predetermined representative value of the luminance levels of the plural pixels can be determined as the luminance information item about the corresponding one of the pixel regions.

That is, the first and second imaging devices 21 and 22 are configured to periodically output a pair of frame images, referred to as first and second frame images To and Tc, to the surround view monitoring apparatus 10 each time they periodically generate the frame images.

The image obtainer 100 of the surround view monitoring apparatus 10 performs an obtaining task that receives the first and second frame images To and Tc of at least one target object captured by the respective first and second imaging devices 21 and 22 that are located at the respective different positions.

Specifically, the image obtainer 100 uses the A/D converter 10a to convert the pair of first and second frame images To and Tc each comprised of the luminance information items into a pair of digital first and second frame images, i.e. a pair of first and second frame image data items, To and Tc. Each of the digital first and second frame images To and Tc is comprised of digital luminance information items respectively corresponding to the luminance information items about the corresponding one of the first and second frame images To and Tc. The digital luminance information item for each pixel of each of the digital first and second frame images To and Tc is comprised of a predetermined luminance-level grayscales, such as 256 luminance-level grayscales. For example, each of the digital first and second frame images To and Tc has a coordinate system that has, for example, a lower left corner thereof as an origin, a horizontal axis passing through the origin in the horizontal row direction as an x axis, and a vertical axis passing through the origin in the vertical column direction as a y axis. The digital first and second frame images To and Tc will also be referred to simply as first and second frame images To and Tc.

Note that, because the distance image sensor apparatus 20 is configured as the stereo camera, any point in the at least one target object in the first and second frame images To and Tc captured by the respective first and second imaging devices 21 and 22 will be projected to a pair of matched pixel regions in the respective first and second frame images To and Tc.

The disparity calculator 110 obtains a selected one of the first and second frame images To and Tc as a base frame image; the other of the first and second frame images To and Tc will be referred to as a reference frame image. In the present embodiment, the display calculator 110 uses the first frame image To as the base frame image, and uses the second frame image Tc as the reference frame image.

That is, the first frame image To captured by the first imaging device 21 includes (1) The luminance information item about each of the pixel regions that constitute the first frame image To (2) A depth distance information item (see reference character DI as an example) about each point (see reference character P as an example) of the at least one target object for the corresponding matched pixel region (see reference character PBo as an example) in the first frame image To Specifically, the depth distance information item about each point of the at least one target object is expressed as a function of a disparity (see reference character L) as an example) of the corresponding matched pixel region PBo in the first frame image To relative to the corresponding matched pixel region (see reference character PBc as an example) in the second frame image (see reference character Tc as an example). The corresponding matched pixel region PBc is located on a predetermined epipolar line EPL1 in the second frame image Tc. More specifically, the depth distance information item about each point of the at least one target object is expressed as a function of the disparity D, the focal length F of the corresponding optical lens, and the length of the baseline BL.

Each of the frame images captured by the distance image sensor apparatus 20 can be a monochrome image or a color image. The distance image sensor apparatus 20 can use any wavelength band for capturing frame images, such as a visible wavelength band or a near-infrared ray band, as long as the used wavelength band enable scenes around the vehicle V to be recognizable.

The disparity calculator 110 obtains, for each pixel region of the base frame image data To, a disparity D.

Specifically, the disparity calculator 110 is configured to
(1) Divide each of the base and reference frame images To and Tc into the pixel regions set forth above
(2) Use a search window whose size is larger than each of the pixel regions of the base frame image To (3) Scan, for each point, i.e. each pixel region (see reference character PBo) in the base frame image To, a region on the epipolar line EPL, which is uniquely defined for the corresponding pixel region PBo of the base frame image To, in the reference image Tc, thus finding a point, i.e. a pixel region (see reference character PBc), matched with the corresponding pixel region in the base frame image To Then, the disparity calculator 110 compares a pattern of the luminance information item about each of the pixel regions PBo in the base frame image To with a pattern of the luminance information item about the corresponding matched pixel region. PBc in the reference frame image Tc, thus calculating the disparity D of each pixel region PBo in the base image To relative to the corresponding matched pixel region PBc.

For example, the disparity calculator 110 can be configured to perform the comparison between the base and reference images To and Tc using one of known evaluation functions, such as an evaluation function based on Sum of Absolute Differences (SAD) or an evaluation function based on Sum of Squared Differences (SSD). In addition, the disparity calculator 110 can calculate the disparity for each pixel region in the base frame image To using a known dense stereo matching method, such as a known semi-global matching (SGM) method or a known efficient large-scale stereo matching (ELAS) method.

The storage unit 101 stores, in the memory device 10d, the base frame image To and the reference frame image Tc, and disparity data including the disparity D for each pixel region PBo in the base frame image To. Note that, in the memory device 10d, a correction parameter k for correcting the disparity L) for each pixel region PBo in the base frame image To can be previously stored.

The distance calculator 120 includes a disparity corrector 122 and a distance corrector 123.

The disparity corrector 122 can be configured to correct the disparity D for each pixel region PBo in the base frame image To in accordance with the correction parameter k stored in the memory device 10d. The disparity corrector 122 can be configured to calculate the correction parameter k, and correct the disparity D for each pixel region PBo in the base frame image To in accordance with the correction parameter k. The disparity corrector 122 can also be configured to calculate positive and negative side tolerances for the disparity d respectively corresponding to far and near side tolerances for a distance Z based on the disparity D.

The following describes how the disparity corrector 122 calculates the correction parameter k.

Triangulation enables the relationship between a depth distance Z about each point of at least one target object and a disparity D of a corresponding matched pixel region in the base frame image To relative to a corresponding matched pixel region in the reference frame image Tc to be expressed by the following equation (1):

$$Z = B \times F / D \qquad (1)$$

where F represents the focal length of the first imaging device 21, and B represents the length of the baseline BL.

Figure 2:
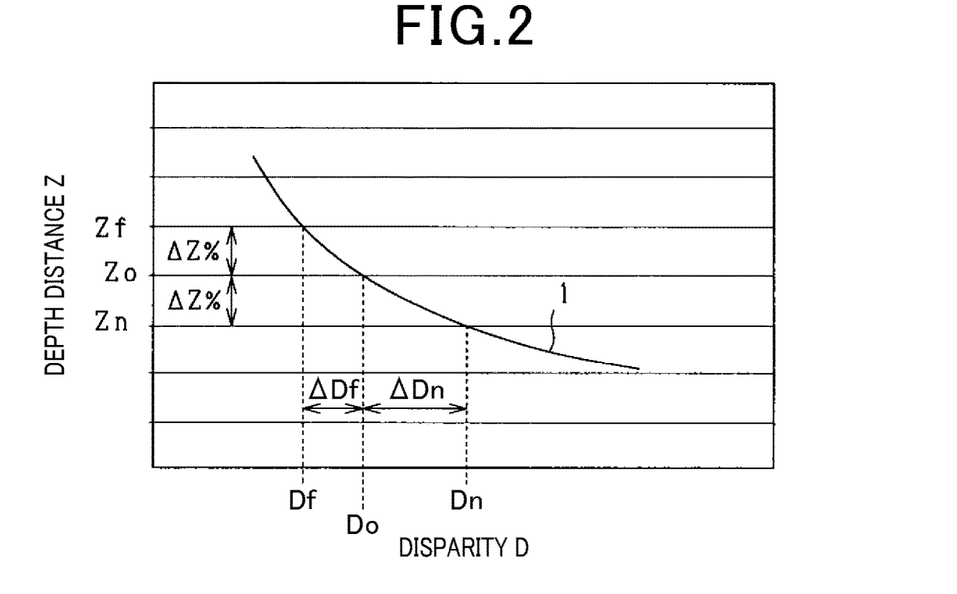
FIG. 2 is a graph schematically illustrating an example of the relationship between a disparity and a depth distance calculated by substituting the disparity into an equation (1) described later.

FIG. 2 schematically illustrates, as a curve C1, an example of the relationship between the disparity D and depth distance Z calculated by substituting the disparity D into the above equation (1). Specifically, the curve C1 can be plotted in accordance with the equation (1).

For example, misalignment of the first and second imaging devices 21 and 22 may cause a positive or negative deviation of the disparity D from its true value. The positive deviation of the disparity D from its true value may cause a near-side deviation included in the corresponding depth distance Z calculated in accordance with the equation (1) from an actual depth distance at the corresponding point relative to the baseline BL of the first and second imaging devices 21 and 22. The negative deviation of the disparity D from its true value may cause a far-side deviation included in the corresponding depth distance Z calculated in accordance with the equation (1) from an actual depth distance at the corresponding point relative to the baseline BL of the first and second imaging devices 21 and 22. The actual depth distance will be referred to as a true depth distance Zo.

As described later, if the determiner 130 is configured to instruct one of the cruise assist devices 30 to perform a task of avoiding a collision between the vehicle V and a target object when determining that an actual distance between the vehicle V and the target object is smaller than a predetermined threshold distance, the surround view monitoring apparatus 10 is configured such that far-side and near-side tolerances $\pm\Delta Z$ % for the true depth distance Zo are established. That is, the far-side tolerance is represented as $+\Delta Z$ %, and the near-side tolerance is represented as $-\Delta Z$ %.

The determiner 130 is configured to determine whether to output, to a selected one of the cruise assist devices 30, an instruction to avoid collision between the vehicle V and the at least one target object in accordance with the calculated depth distance Z and the far- and near-side tolerances $\pm\Delta Z$ % therefor.

The far-side and near-side tolerances $\pm\Delta Z$ % for the true depth distance Zo represent far-side and near-side tolerances for the true depth distance Zo that are allowable by the surround view monitoring apparatus 10. That is, the far-side and near-side tolerances $\pm\Delta Z$ % for the true depth distance Zo can be provided for each of various types of target objects monitored by the surround view monitoring apparatus 10. The far-side and near-side tolerances $\pm\Delta Z$ % for the true depth distance Zo can also be provided for each of collision avoidance tasks respectively carried out by the cruise assist devices 30.

Specifically, the surround view monitoring apparatus 10 previously determines the far-side tolerance $+\Delta Z$ % for the true depth distance Zo based on far-side errors in calculation of the depth distance Z, and the near-side tolerances $-\Delta Z$ % for the true depth distance Zo based on near-side in calculation of the depth distance Z using, for example, experiments and/or computer simulations.

Specifically, the surround view monitoring apparatus 10 previously establishes a tolerance range from a lower limit distance Zn, which is expressed by the equation $\{Zo \times (1-\Delta Z/100)\}$ to an upper limit distance Zf of the tolerable distance range, which is expressed by the equation $\{Zo \times (1+\Delta Z/100)\}$ inclusive. The tolerance range will be referred to as a tolerable distance range (Zn to Zf).

That is, the memory device 10d of the surround view monitoring apparatus 10 stores the lower limit distance Zn and the upper limit distance Zf previously determined for each of the predetermined true distances Zo as an information file FI1 in, for example, a table format.

Specifically, the determiner 130 is configured to (1) Read, from the memory device 10d, the lower limit distance Zn and the upper limit distance Zf of a value of the true distance Zo corresponding to the calculated depth distance Z (2) Perform a comparison between the tolerable distance range (Zn to Zf) for the calculated depth distance Z and a predetermined threshold distance upon determining that the calculated depth distance Z is located within the tolerable distance range (Zn to Zf) based on the read lower limit distance Zn and the read upper limit distance Zf (3) Whether to instruct one of the cruise assist devices 30 to perform a task of avoiding a collision between the vehicle V and a target object in accordance with the comparison result Allowable first and second tolerances for the disparity D corresponding to the true depth distance Zo can be calculated based on the tolerable distance range (Zn to Zf). Specifically, assigning the lower limit distance Zn and the upper limit distance Zf to the depth distance Z in the equation (1) enables the equation (1) to be transformed to the following equations (2) and (3):

$$Df = B \times F/Zf = B \times F/\{Zo(1+\Delta Z/100)\} \quad (2)$$

$$Dn = B \times F/Zn = B \times F/\{Zo(1-\Delta Z/100)\} \quad (3)$$

That is, this makes it possible to calculate a lower limit disparity Df and an upper limit disparity Dn of a true disparity Do, which correspond to the respective upper limit distance Zf and the lower limit distance Zn of the true depth distance Zo, in accordance with the equations (2) and (3).

That is, the surround view monitoring apparatus 10 previously establishes a tolerance range from the lower limit disparity Df to the upper limit disparity Dn inclusive for the true disparity Do corresponding to the true depth distance Zo; the tolerance range will be referred to as a tolerable disparity range (Df to Dn).

For example, the memory device 10d of the surround view monitoring apparatus 10 can store the lower limit disparity Df and the upper limit disparity Dn previously calculated for each of the true disparities Do as an information file FI2 in, for example, a table format.

Note that assigning the true depth distance Zo to the equation (1) enables the true disparity Do to be calculated. That is, the true disparity Do can be calculated based on the focal length F of the first imaging device 21 and the length B of the baseline BL by triangulation if there is no misalignment of the first and second imaging devices 21 and 22.

FIG. 2 shows that the true disparity Do is located within the tolerable disparity range (Df to Dn), and that an absolute difference $\Delta Df$ between the lower limit disparity Df and the true disparity Do is smaller than an absolute difference $\Delta Dn$ between the upper limit disparity Dn and the true disparity Do, which is expressed by the following equation ($\Delta Df < \Delta Dn$). Specifically, as illustrated in FIG. 2, the true disparity Do is located to be closer to the lower limit disparity Df than to the upper limit disparity Dn. In other words, the true disparity Do is located at the left side of the center reference character Dc) of the tolerance disparity range (Df to Dn).

That is, FIG. 2 shows that the negative-side absolute deviation $\Delta Df$ of the disparity from the true disparity Do, which corresponds to the far-side absolute deviation $\Delta Z$ from the true depth distance Zo, is smaller than the positive-side deviation $\Delta Dn$ of the disparity from the true disparity Do, which corresponds to the near-side deviation $\Delta Z$ from the true depth distance Zo. In other words, a far-side deviation of the distance from the true depth distance Zo in a first deviation case is larger than a near-side deviation of the distance from the true depth distance Zo in a second deviation case if the absolute magnitude of the negative-side deviation of the disparity from the true disparity Do in the first deviation case is identical to the absolute magnitude of the positive-side deviation of the disparity from the true disparity Do in the second deviation.

On the other hand, if misalignment of the first and second imaging devices 21 and 22 or another factor causes a positive or negative deviation of the disparity D from its true value Do, the positive deviation of the disparity D is likely to be identical to the negative deviation of the disparity D. The actual positive and negative deviations of the disparity D need to satisfy the following condition that a value of the depth distance Z based on an actual positive or negative deviation of the disparity D need be included within the tolerable distance range (Zn to Zf).

As illustrated in FIG. 2, if the actual positive deviation and the actual negative deviation are each set to $\Delta D$, an absolute value of each of the actual positive and negative deviations $\Delta D$ need be equal to or smaller than an absolute value of the negative-side absolute deviation $\Delta Df$, because the absolute value of the negative-side absolute deviation $\Delta Df$ is smaller than the positive-side absolute deviation $\Delta Dn$.

That is, if the absolute value of each of the actual positive and negative deviations $\Delta D$ were larger than the absolute value of the negative-side absolute deviation $\Delta Df$, the distance based on the disparity D including the actual negative-side deviation $\Delta D$ would be outside the tolerable distance range (Zn to Zf).

In contrast, even if there is a positive-side deviation of the disparity D from the true disparity Do so that the disparity D were larger than the sum of the true disparity Do and the negative-side absolute deviation $\Delta Df$ and equal to or smaller than the positive-side absolute deviation $\Delta Dn$, which is expressed by the equation "$(Do+\Delta Df)<D\leq Dn$", the distance based on the disparity D would be within the tolerable distance range (Zn to Zf).

Figure 3:
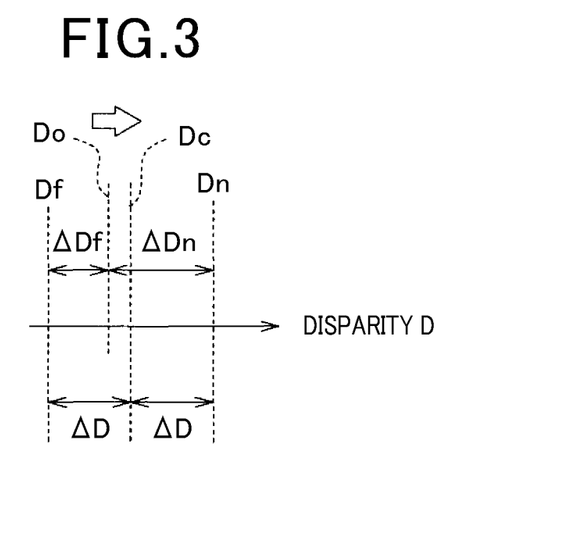
FIG. 3 is a diagram schematically illustrating how a disparity corrector illustrated in FIG. 1 corrects the disparity.

From this viewpoint, the disparity corrector 122 is configured to correct, based on the tolerable disparity range (Df to Do), the disparity D calculated by the disparity calculator 110 to thereby increase the disparity D (see the arrow AR in FIG. 3). For example, the disparity corrector 122 is configured to correct, based on the tolerable disparity range (Df to Do), the disparity D calculated by the disparity calculator 110 using the correction parameter k stored in the memory device 10d; the correction parameter k enables the disparity D to be corrected to a larger value. For example, the disparity corrector 122 is configured to multiply the disparity D by the correction parameter k, which is expressed by "$(k \times D)$", the correction parameter k being set to any value larger than 1. This enables the product of the disparity D and the correction parameter k, which is expressed by "$(k \times D)$", to be larger than the disparity D.

FIGS. 2 and 3 show that the true disparity Do is smaller than the center Dc of the tolerance disparity range (Df to Dn). For this reason, the disparity corrector 122 is configured to correct the disparity D to be larger to thereby accordingly correct the true disparity Do to be closer to the center Dc of the tolerance disparity range (Df to Dn).

This correction of the disparity D enables the difference between a far-side deviation of the depth distance Z due to a negative-side deviation of the disparity D and a near-side deviation of the depth distance Z due to a positive-side deviation of the disparity D to be reduced.

The correction parameter k is preferably set to enable the disparity D to be larger in accordance with the true disparity Do and the tolerance disparity range (Df to Dn), thus accordingly correct the true disparity Do to be closer to the center Dc of the tolerance disparity range (Df to Dn).

The disparity corrector 122 is preferably configured to calculate, as the correction parameter k, a correction parameter ko for transforming the true disparity Do into the center Dc of the tolerance disparity range (Df to Dn), and correct the disparity D calculated by the disparity calculator 110 using the correction parameter ko.

That is, as illustrated in FIG. 3, transforming the true disparity Do into the center Dc of the tolerance disparity range (Df to Dn) enables an actual positive and negative deviation range of the disparity D, which is defined from the lower limit of (Dc−$\Delta D$) to the upper limit of (Dc+$\Delta D$), to be included within the tolerance disparity range (Df to Dn) as long as the magnitude of the actual positive and negative deviation range of the disparity D is equal to or smaller than the magnitude of the tolerance disparity range (Df to Dn).

The following describes an example of a method of calculating the correction parameter ko as an example of a method of calculating the correction parameter k.

Assuming that the product of the correction parameter ko and the true disparity Do becomes equal to the center Dc of the tolerance disparity range (Df to Dn), the disparity corrector 122 makes it possible to calculate the correction parameter ko in accordance with the following equations (4) and (5):

$$Dc=(Df+Dn)/2 \quad (4)$$

$$ko=Dc/Do=(Df+Dn)/(B \times F/Zo) \quad (5)$$

That is, the disparity corrector 122 multiplies the disparity D calculated by the disparity calculator 110 by the correction parameter ko, thus correcting the disparity D to a corrected disparity (ko×D). As illustrated in FIGS. 2 and 3, the center Dc of the tolerance disparity range (Df to Dn) is larger than the true disparity Do, the correction parameter ko, which is expressed by the equation ko=Dc/Do, is larger than 1 (see the equation (5)), thus enabling the corrected disparity (ko×D) to be larger than the disparity D calculated by the disparity calculator 110

The distance corrector 123 calculates, based on the corrected disparity (k×D), the depth distance Z about each point of the at least one target object relative to the baseline BL between the first and second imaging devices 21 and 22 in accordance with the following equation (6):

$$Z=(B \times F)/(k \times D) \quad (6)$$

Note that the distance calculator 123 is preferably configured to use the corrected disparity (ko×D) as an example of the corrected disparity (k×D).

The determiner 130 is configured to determine, based on the calculated depth distance Z about each point on the at least one target object, whether to output, to a selected one of the cruise assist devices 30, an instruction to avoid collision between the vehicle V and the at least one target object. Specifically, the determiner 130 is configured to output, to a selected one of the cruise assist devices 30, an instruction to avoid collision between the vehicle V and the at least one target object upon determining that the tolerable distance range (Zn to Zf) is smaller than the predetermined threshold distance.

That is, the determiner 130 and the cruise assist devices 30 constitute, for example, a pre-crash safety system (PCSS).

The determiner 130 can be configured to (1) Identify a type of the at least one target object based on the luminance information item about each of the pixel regions and the depth distance Z about each point on the at least one target object (2) Determine whether to output, to a selected one of the cruise assist devices 30, an instruction to avoid collision between the vehicle V and the at least one target object in accordance with the identified type of the at least one target object and the depth distance Z about each point on the at least one target object For example, the memory device 10*d* stores object model dictionary files DF. The object model dictionary files DF are provided for respective types of target objects, such as vehicles, pedestrians, bicycles, and traffic obstacles including guardrails, electric poles, and traffic signs. In particular, each of the dictionary files DF includes object models, i.e. feature quantity templates, i.e. feature quantity patterns, provided for the corresponding object type.

That is, the determiner 130 can be configured to perform pattern matching of the base frame image To with each of the feature patterns included in all the dictionary files DF to thereby identify the type of the at least one target object.

The cruise assist devices 30 include, for example, a warning device 31, a display device 32, and cruise control devices 33.

The warning device 31 includes, for example, a speaker mounted in the compartment of the vehicle V. The warning device 31 is configured to output warnings including, for example, warning sounds to inform the driver of the presence of the at least one target object in response to a control instruction sent from the surround view monitoring apparatus 10.

The display device 32 is mounted in the compartment of the vehicle V. The display device 32 is configured to output warning messages to inform the driver of the presence of the at least one target object in response to a control instruction sent from the surround view monitoring apparatus 10.

The cruise control devices 33 include a brake device configured to brake the vehicle V. The brake device is activated in response to a control instruction sent from the surround view monitoring apparatus 10. Specifically, the brake device performs a brake-assist function of increasing braking force, which is based on the driver's brake operation, to the vehicle V, or an automatic brake function of automatically braking the vehicle V if there is no braking operation by the driver.

The cruise control devices 33 also include a steering device configured to control the travelling course of the vehicle V. The steering device is activated in response to a control instruction sent from the surround view monitoring apparatus 10. Specifically, the steering device performs a steering assist function of assisting a driver's steering operation of the steering wheel of the vehicle V, or an automatic steering function of automatically steering the vehicle V if there is no steering operation by the driver.

Figure 4:
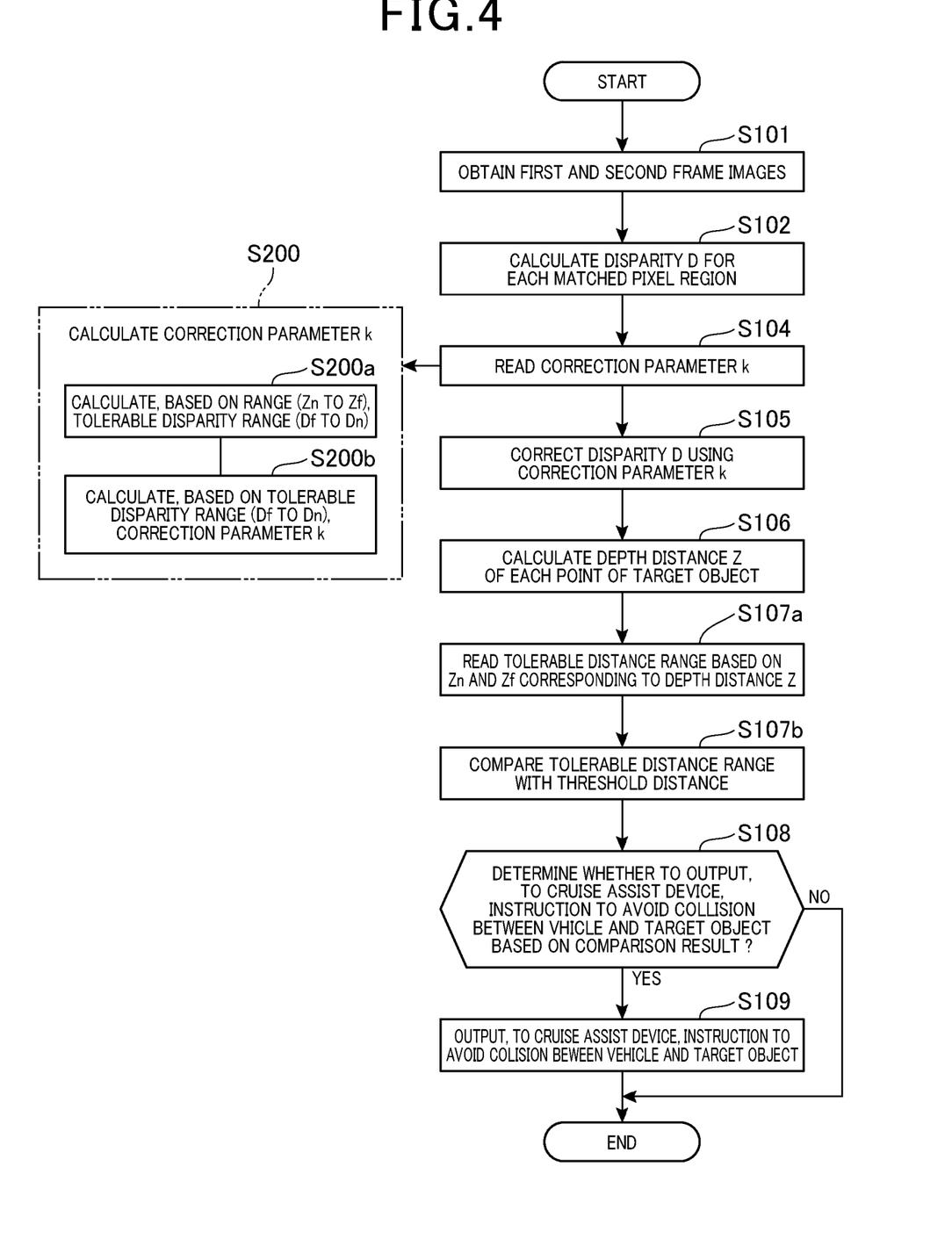
FIG. 4 is a flowchart schematically illustrating an example of a surround view monitoring routine carried out by a surround view monitoring apparatus illustrated in FIG. 1.

Next, the following describes a surround view monitoring routine carried out by the surround view monitoring apparatus 10 with reference to FIG. 4. The CPU 10*c* of the surround view monitoring apparatus 10 can be programmed to execute at least one program stored in the memory device 10*d* to thereby execute the surround view monitoring routine every predetermined period. Hereinafter, one iteration of a surround view monitoring routine periodically performed by the CPU 10*c* will be referred to as a cycle.

Upon starting a current cycle of the surround view monitoring routine, the CPU 10*c* serves as, for example, the image obtainer 100 to execute an image obtaining step that obtains, from the distance image sensor apparatus 20, a pair of the first and second frame images To and Tc of at least one common target object from the different positions such that the first frame image To is synchronized with the second frame image Tc in step S101.

Next, the CPU 10*c* serves as, for example, the disparity calculator 110 to execute a disparity calculation step that (1) Selects, for example, the first frame image To as a base frame image, so that the remaining second frame image Tc as a reference frame image (2) Calculates, for each point of the at least one target object, a disparity D for the corresponding matched pixel region of the base frame image To relative to the corresponding matched pixel region of the reference frame image Tc Note that, if each matched pixel region of the base frame image To, which is matched with the corresponding pixel region of the reference frame image Tc, corresponds to plural points of the at least one target object, the CPU 10*c* can calculate the disparity value for each of the points of the at least one target object based on the base and reference frame images To and Tc, and calculate an average value of the calculated disparity values as a disparity D for each matched pixel region of the base frame image To.

Next, the CPU 10*c* serves as, for example, the distance calculator 120 to execute a distance calculation subroutine that calculates, based on the disparity D for each matched pixel region of the base frame image To, the depth distance Z of the corresponding point of the at least one target object in steps S104 to S106.

Specifically, the CPU 10*c* serves as, for example, the disparity corrector 122 to execute a disparity correction step that reads the correction parameter k stored in the memory device 10*d* in step S104, and multiplies the correction parameter k to the disparity D for each matched pixel region of the base frame image To calculated in step S102, thus correcting the disparity D to a corrected disparity (k×D) in accordance with the equations (4) and (5) in step S105. The correction of the disparity D based on the correction parameter k that is set to be larger than 1 enables the disparity D to be converted into the larger value.

Following the operation in step S105, the CPU 10*c* serves as, for example, the distance corrector 123 to execute a distance correction step that calculates, based on the corrected disparity (k×D) for each matched pixel region of the base frame image To, the depth distance Z of the corresponding point of at least one target object relative to the baseline BL of the surround view monitoring apparatus 10 in step S106.

Following the subroutine in steps S104 to S106, the CPU 10*c* serves as, for example, the determiner 130 to execute a determination step that (1) Read, from the memory device 10*d*, the tolerable distance range (Zn to Zf) for a value of the true distance Zo corresponding to the calculated depth distance Z in step S107*a*

(2) Perform a comparison between the tolerable distance range (Zn to Zf) for the calculated depth distance Z and a predetermined threshold distance in step S107*b*

That is, the CPU 10*c* is configured to determine, based on a comparison result in step S107*b*, whether to output, to a selected one of the cruise assist devices 30, an instruction to avoid collision between the vehicle V and the at least one target object in step S108.

Upon determining to output the instruction to the selected one of the cruise assist devices 30 based on the comparison result (YES in step S108), the CPU 10*c* outputs the instruction to the selected one of the cruise assist devices 30 in step S109. Otherwise, upon determining not to output the instruction to the selected one of the cruise assist devices 30 based on the comparison result (NO in step S108), the CPU 10*c* terminates the surround view monitoring routine.

For example, upon determining that a value selected from the tolerable distance range (Zn to Zf) is smaller than the threshold distance, the CPU 10c determines to output the instruction to the selected one of the cruise assist devices 30.

As described above, the disparity corrector 122 of the surround view monitoring apparatus 10 corrects the disparity D for each matched pixel region of the base frame image To, thus making larger the disparity D for the corresponding matched pixel region of the base frame image To. Increasing the disparity D for each matched pixel region of the base frame image To enables a difference between a far-side deviation of the depth distance Z due to a negative-side deviation of the disparity D and a near-side deviation of the depth distance Z due to a positive-side deviation of the disparity D to be reduced. This enables at least the negative deviation range of the disparity D to have a margin, thus preventing the actual depth distance between the vehicle V and the at least one target object from exceeding the far-side upper limit Zf of the tolerable distance range. This therefore makes it possible to more accurately monitor the at least one target object around the vehicle V based on the depth distance Z of each point of the at least one target object.

In particular, the disparity corrector 122 of the surround view monitoring apparatus 10 corrects the disparity D for each matched pixel region of the base frame image To using the correction parameter ko as an example of the correction parameter k in accordance with, for example, the equation (5). This enables a difference between a far-side deviation of the depth distance Z due to a negative-side deviation of the disparity D and a near-side deviation of the depth distance Z due to a positive-side deviation of the disparity D to be substantially identical to each other. This therefore makes it possible to even more accurately monitor the at least one target object around the vehicle V based on the depth distance Z of each point of the at least one target object independently of a positive or negative deviation of the disparity D.

The disparity corrector 122 of the surround view monitoring apparatus 10 corrects the disparity D using the correction parameter k stored in the memory device 10d, but can be configured to calculate the correction parameter k. At that time, the disparity corrector 122 can be configured to calculate the tolerable disparity range (Df to Dn).

For example, in step S200 in place of step S104, the CPU 10c serves as, for example, the disparity corrector 122 to execute a correction parameter calculation step that calculates the correction parameter k.

Specifically, the CPU 10c serves as, for example, the disparity corrector 122 to execute a tolerable distance range calculation step that calculates, based on the tolerable distance range (Zn to Zf), the tolerable disparity range (Df to Dn) in accordance with the equations (2) and (3) in step S200a. Next, the CPU 10c serves as, for example, the disparity corrector 122 to execute a tolerable distance range calculation step that calculates, based on the tolerable disparity range (Df to Dn), the correction parameter k in accordance with the equations (4) and (5) in step S200b. Note that the tolerable distance range (Zn to Zf) can determined beforehand, and at least the upper limit distance Zf, the lower limit distance Zn, and the corresponding true depth distance Zo can also be stored beforehand in the memory device 10d.

The tolerable disparity range (Df to Dn) calculatable based on the tolerable distance range (Zn to Zf) can be stored beforehand in the memory device 10d. At that time, in step S200a, the CPU 10c reads the tolerable disparity range (Df to Dn) from the memory device 10d.

The surround view monitoring apparatus 10 according to the present embodiment is configured not to include the distance image sensor apparatus 20 and the cruise assist devices 30, but can be configured to include the distance image sensor apparatus 20 and/or the cruise assist devices 30.

The functions of one element in the present embodiment can be distributed as plural elements, and the functions that plural elements have can be combined into one element. At least part of the structure of the present embodiment can be replaced with a known structure having the same function as the at least part of the structure of the present embodiment. A part of the structure of the present embodiment can be eliminated. All aspects included in the technological ideas specified by the language employed by the claims constitute embodiments of the present disclosure.

The present disclosure can be implemented by various embodiments; the various embodiments include systems each including the surround view monitoring apparatus 10, programs for serving a computer as the surround view monitoring apparatus 10, storage media, such as non-transitory media, storing the programs, and surround view monitoring methods.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for monitoring a target object around a vehicle based on at least a pair of a base image and a reference image synchronously captured at respective different positions of the vehicle, each of the base and reference images being comprised of a plurality of pixel regions, the apparatus comprising:
 a disparity calculator configured to:
 obtain, for each point of the target object, a pair of matched pixel regions in the respective base image and reference image corresponding to the point of the target object; and
 calculate a disparity of each of the matched pixel regions of the base image relative to the corresponding matched pixel region of the reference image; and
 a distance calculator configured to:
 correct the calculated disparity of each of the matched pixel regions of the base image in accordance with a predetermined tolerable disparity range for the disparity to thereby increase the calculated disparity of the corresponding one of the matched pixel regions of the base image, the predetermined tolerable disparity range corresponding to a predetermined tolerable distance range for a depth distance of the target object relative to the vehicle; and
 calculate the depth distance of each point of the target object relative to the vehicle as a function of the corrected disparity of the corresponding one of the matched pixel regions.

2. The apparatus according to claim 1, wherein:
 the distance calculator is configured to:
 obtain a true disparity of each of the matched pixel regions of the base image corresponding to a predetermined true depth distance of the corresponding point of the target object relative to the vehicle; and correct the calculated disparity of each of the matched pixel regions of the base image in accordance with the tolerable disparity range and the true disparity of the corresponding one of the matched pixel regions of the base image.

3. The apparatus according to claim 1, wherein:

the distance calculator is configured to correct the calculated disparity of each of the matched pixel regions of the base image based on a correction parameter to thereby transform the true disparity into a center of the tolerable disparity range.

4. The apparatus according to claim 3, wherein:

the distance calculator is configured to:

calculate, based on the tolerable distance range, the tolerable disparity range; and calculate, based on the calculated tolerable disparity range, the correction parameter.

5. The apparatus according to claim 1, further comprising:

a storage storing the tolerable distance range, the tolerable distance range being defined as a range from a lower limit distance to an upper limit distance for a true depth distance of each point of the target object relative to the vehicle; and a determiner configured to:

read the tolerable distance range corresponding to the calculated depth distance from the storage; and perform a comparison between the tolerable distance range and a predetermined threshold distance.

6. A method of monitoring a target object around a vehicle based on at least a pair of a base image and a reference image synchronously captured at respective different positions of the vehicle, each of the base and reference images being comprised of a plurality of pixel regions, the method comprising:

obtaining, for each point of the target object, a pair of matched pixel regions in the respective base image and reference image corresponding to the point of the target object;

calculating a disparity of each of the matched pixel regions of the base image relative to the corresponding matched pixel region of the reference image;

correcting the calculated disparity of each of the matched pixel regions of the base image in accordance with a predetermined tolerable disparity range for the disparity to thereby increase the calculated disparity of the corresponding one of the matched pixel regions of the base image, the predetermined tolerable disparity range corresponding to a predetermined distance tolerable range for a depth distance of the target object relative to the vehicle; and calculating the depth distance of each point of the target object relative to the vehicle as a function of the corrected disparity of the corresponding one of the matched pixel regions.

7. An apparatus for monitoring a target object around a vehicle based on at least a pair of a base image and a reference image synchronously captured at respective different positions of the vehicle, each of the base and reference images being comprised of a plurality of pixel regions, the apparatus comprising:

a processor;

a non-transitory computer readable storage medium; and a set of computer-executable instructions stored on the computer-readable storage medium that cause the processor to implement:

obtaining, for each point of the target object, a pair of matched pixel regions in the respective base image and reference image corresponding to the point of the target object;

calculating a disparity of each of the matched pixel regions of the base image relative to the corresponding matched pixel region of the reference image;

correcting the calculated disparity of each of the matched pixel regions of the base image in accordance with a predetermined tolerable disparity range for the disparity to thereby increase the calculated disparity of the corresponding one of the matched pixel regions of the base image, the predetermined tolerable disparity range corresponding to a predetermined distance tolerable range for a depth distance of the target object relative to the vehicle; and calculating the depth distance of each point of the target object relative to the vehicle as a function of the corrected disparity of the corresponding one of the matched pixel regions.

* * * * *